(12) United States Patent
Takayama

(10) Patent No.: US 11,840,310 B2
(45) Date of Patent: Dec. 12, 2023

(54) CONTROL DEVICE FOR HUMAN-POWERED VEHICLE

(71) Applicant: Shimano Inc., Osaka (JP)

(72) Inventor: Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 314 days.

(21) Appl. No.: 17/167,533

(22) Filed: Feb. 4, 2021

(65) Prior Publication Data

US 2021/0276660 A1 Sep. 9, 2021

(30) Foreign Application Priority Data

Mar. 9, 2020 (JP) ................. 2020-040284

(51) Int. Cl.
| | |
|---|---|
| *B62M 6/45* | (2010.01) |
| *B62L 3/00* | (2006.01) |
| *B62J 45/00* | (2020.01) |

(52) U.S. Cl.
CPC ................. *B62M 6/45* (2013.01); *B62L 3/00* (2013.01); *B62J 45/00* (2020.02)

(58) Field of Classification Search
CPC .... B62M 6/45; B62M 6/40; B62L 3/00; B62J 45/00
See application file for complete search history.

(56) References Cited

U.S. PATENT DOCUMENTS

| | | | |
|---|---|---|---|
| 6,866,111 B2* | 3/2005 | Dube | B62M 6/45 310/67 R |
| 9,561,734 B2 | 2/2017 | Watarai et al. | |
| 10,086,708 B2 | 10/2018 | Ichida et al. | |
| 10,696,351 B2* | 6/2020 | Suzuki | F16H 61/02 |
| 10,974,708 B2* | 4/2021 | Takayama | B60T 8/1706 |
| 11,407,471 B2* | 8/2022 | Nishino | B62L 1/005 |
| 2005/0252706 A1* | 11/2005 | Thomas | B62M 6/45 180/206.6 |
| 2018/0009508 A1* | 1/2018 | Suzuki | B62M 6/50 |
| 2019/0118785 A1* | 4/2019 | Takayama | B62M 6/40 |
| 2019/0118900 A1* | 4/2019 | Nishino | B62K 23/02 |
| 2019/0248444 A1 | 8/2019 | Katsuki et al. | |
| 2020/0010144 A1* | 1/2020 | Kondo | B62K 23/00 |
| 2021/0031848 A1* | 2/2021 | Du | G05B 19/042 |
| 2021/0114687 A1* | 4/2021 | Chang | B62K 23/02 |
| 2021/0147029 A1* | 5/2021 | Komatsu | B62M 6/45 |
| 2022/0194518 A1* | 6/2022 | Kondo | B62K 23/00 |

FOREIGN PATENT DOCUMENTS

| | | |
|---|---|---|
| DE | 10 2011 084 601 A1 | 4/2013 |
| JP | 2018-103798 A | 7/2018 |
| JP | 2019-137231 A | 8/2019 |

* cited by examiner

*Primary Examiner* — Kevin Hurley
*Assistant Examiner* — Michael R Stabley
(74) *Attorney, Agent, or Firm* — Global IP Counselors, LLP

(57) ABSTRACT

A human-powered vehicle control device for a human-powered vehicle includes an electronic controller that controls an electric brake device and a component of the human-powered vehicle that differs from the electric brake device. The electric brake device and the component are supplied with electric power from a common battery. The electronic controller gives actuation priority to the electric brake device over the component.

19 Claims, 9 Drawing Sheets

CONTROL DEVICE FOR HUMAN-POWERED VEHICLE

CROSS-REFERENCE TO RELATED APPLICATIONS

This application claims priority to Japanese Patent Application No. 2020-040284, filed on Mar. 9, 2020. The entire disclosure of Japanese Patent Application No. 2020-040284 is hereby incorporated herein by reference.

BACKGROUND

Technical Field

The present invention generally relates to a control device for a human-powered vehicle.

Background Information

Japanese Laid-Open Patent Publication No. 2018-103798 (Patent Document 1) discloses an example of a control device for a human-powered vehicle that supplies electric power to multiple components of the human-powered vehicle from a single battery. The components include an electric brake device.

SUMMARY

One object of the present disclosure is to provide a human-powered vehicle control device for a human-powered vehicle that controls an electric brake device in a preferred manner.

A human-powered vehicle control device in accordance with a first aspect of the present disclosure is for a human-powered vehicle. The human-powered vehicle control device comprises an electronic controller configured to control an electric brake device and a component of the human-powered vehicle that differs from the electric brake device. The electric brake device and the component are supplied with electric power from a common battery. The electronic controller is configured to give actuation priority to the electric brake device over the component.

The human-powered vehicle control device according to the first aspect gives actuation priority to the electric brake device over the human-powered vehicle component differing from the electric brake device. Thus, the electric brake device is controlled in a preferred manner.

In accordance with a second aspect of the present disclosure, the human-powered vehicle control device according to the first aspect is configured so that the electronic controller configured to actuate the electric brake device upon determining at least one of a traveling environment of the human-powered vehicle, a traveling state of the human-powered vehicle, and an operation state of the electric brake device is in a first condition. The electronic controller is configured to actuate the component in a case where at least one of the traveling environment of the human-powered vehicle and the traveling state of the human-powered vehicle is in a second condition. Upon determining the first condition and the second condition are both satisfied, the electronic controller is configured to actuate the electric brake device and restrict actuation of the component, or actuate the electric brake device and then actuate the component.

The human-powered vehicle control device according to the second aspect actuates the component after actuating the electric brake device or restricts actuation of the component. Thus, the electric brake device is controlled in a preferred manner.

A human-powered vehicle control device in accordance with a third aspect of the present disclosure is for a human-powered vehicle. The human-powered vehicle control device comprises an electronic controller configured to control an electric brake device and a component of the human-powered vehicle that differs from the electric brake device. The electric brake device and the component are supplied with electric power from a common battery. The electronic controller is configured to actuate the electric brake device upon determining at least one of a traveling environment of the human-powered vehicle, a traveling state of the human-powered vehicle, and an operation state of the electric brake device is in a first condition. The electronic controller is configured to actuate the component in a case where at least one of the traveling environment of the human-powered vehicle and the traveling state of the human-powered vehicle is in a second state. Upon determining the first condition and the second condition are both satisfied, the electronic controller is configured to actuate the electric brake device and restrict actuation of the component, or actuate the electric brake device and then actuate the component.

The human-powered vehicle control device according to the third aspect actuates the component after actuating the electric brake device or restricts actuation of the component. Thus, the electric brake device is controlled in a preferred manner.

In accordance with a fourth aspect of the present disclosure, the human-powered vehicle control device according to the second or third aspect is configured so that upon determining the first condition and the second condition are both satisfied and at least one of the traveling environment of the human-powered vehicle and the traveling state of the human-powered vehicle is in a third condition, the electronic controller is configured to actuate the electric brake device and restricts actuation of the component or actuates the electric brake device and then actuates the component. Upon determining the first condition and the second condition are both satisfied and at least one of the traveling environment of the human-powered vehicle and the traveling state of the human-powered vehicle is in a fourth condition, the electronic controller is configured to not to restrict actuation of the component or simultaneously actuates the electric brake device and the component. Each of the third condition and the fourth condition is related to at least one of an electric power usage amount of the electric brake device, a required braking force of the electric brake device, a battery level of the battery, and a parameter related to a vehicle kinetic state of the human-powered vehicle.

The human-powered vehicle control device according to the fourth aspect actuates the component after actuating the electric brake device or restricts actuation of the component in the third condition and simultaneously actuates the component and the electric brake device or does not restrict actuation of the component in the fourth condition in accordance with the electric power usage amount of the electric brake device, the required braking force of the electric brake device, the battery level of the battery, and the parameter related to the vehicle state of the human-powered vehicle. Thus, the electric brake device is controlled in a preferred manner.

In accordance with a fifth aspect of the present disclosure, the human-powered vehicle control device according to the fourth aspect is configured so that the third condition includes a case where the electric power usage amount of the electric brake device is greater than a first electric power usage amount.

The human-powered vehicle control device according to the fifth aspect controls the electric brake device in a preferred manner in a case where the electric power usage amount of the electric brake device is greater than the first electric power usage amount.

In accordance with a sixth aspect of the present disclosure, the human-powered vehicle control device according to the fourth or fifth aspect is configured so that the third condition includes a case where a sum of the electric power usage amount of the electric brake device and an electric power usage amount of the component is greater than a second electric power usage amount.

The human-powered vehicle control device according to the sixth aspect controls the electric brake device in a preferred manner in a case where the sum of the electric power usage amount of the electric brake device and the electric power usage amount of the component is greater than the second electric power usage amount.

In accordance with a seventh aspect of the present disclosure, the human-powered vehicle control device according to any one of the fourth to sixth aspects is configured so that the third condition includes a case where the required braking force of the electric brake device is greater than a first braking force.

The human-powered vehicle control device according to the seventh aspect controls the electric brake device in a preferred manner in a case where the required braking force of the electric brake device is greater than the first braking force.

In accordance with an eighth aspect of the present disclosure, the human-powered vehicle control device according to any one of the fourth to seventh aspects is configured so that the third condition includes a case where the battery level is less than or equal to a first level.

The human-powered vehicle control device according to the eighth aspect controls the electric brake device in a preferred manner in a case where the battery level of the battery is less than or equal to the first level.

In accordance with a ninth aspect of the present disclosure, the human-powered vehicle control device according to any one of the fourth to eighth aspects is configured so that the third condition includes a case where the parameter related to the vehicle kinetic state is less than or equal to a first value.

The human-powered vehicle control device according to the ninth aspect controls the electric brake device in a preferred manner in a case where the parameter related to the vehicle kinetic state of the human-powered vehicle is less than or equal to the first value.

In accordance with a tenth aspect of the present disclosure, the human-powered vehicle control device according to any one of the fourth to ninth aspects is configured so that the fourth condition includes a case where the electric power usage amount of the electric brake device is less than or equal to a third electric power usage amount.

The human-powered vehicle control device according to the tenth aspect controls the electric brake device in a preferred manner in a case where the electric power usage amount of the electric brake device is less than or equal to than the third electric power usage amount.

In accordance with an eleventh aspect of the present disclosure, the human-powered vehicle control device according to any one of the fourth to tenth aspects is configured so that the fourth condition includes a case where a sum of the electric power usage amount of the electric brake device and an electric power usage amount of the component is less than or equal to a fourth electric power usage amount.

The human-powered vehicle control device according to the eleventh aspect controls the electric brake device in a preferred manner in a case where the sum of the electric power usage amount of the electric brake device and the electric power usage amount of the component is less than or equal to the fourth electric power usage amount.

In accordance with a twelfth aspect of the present disclosure, the human-powered vehicle control device according to any one of the fourth to eleventh aspects is configured so that the fourth condition includes a case where the required braking force is less than or equal to a second braking force.

The human-powered vehicle control device according to the twelfth aspect controls the electric brake device in a preferred manner in a case where the required braking force of the electric brake device is less than or equal to the second braking force.

In accordance with a thirteenth aspect of the present disclosure, the human-powered vehicle control device according to any one of the fourth to twelfth aspects is configured so that the fourth condition includes a case where the battery level is greater than a second level.

The human-powered vehicle control device according to the thirteenth aspect controls the electric brake device in a preferred manner in a case where the battery level of the battery is greater than the second level.

In accordance with a fourteenth aspect of the present disclosure, the human-powered vehicle control device according to any one of the fourth to thirteenth aspects is configured so that the fourth condition includes a case where the parameter related to the vehicle kinetic state is greater than a second value.

The human-powered vehicle control device according to the fourteenth aspect controls the electric brake device in a preferred manner in a case where the parameter related to the vehicle kinetic state of the human-powered vehicle is greater than the second value.

In accordance with a fifteenth aspect of the present disclosure, the human-powered vehicle control device according to any one of the second to fourteenth aspects is configured so that the component includes a plurality of components. Upon determining the first condition and the second condition are both satisfied, the electronic controller is configured to control the component in accordance with a component type.

The human-powered vehicle control device according to the fifteenth aspect controls the component in accordance with type of the component. Thus, the component is controlled in a preferred manner.

In accordance with a sixteenth aspect of the present disclosure, the human-powered vehicle control device according to any one of the first to fifteenth aspects is configured so that in at least one of a case where the electronic controller restricts actuation of the electric brake device and a case where the electronic controller restricts actuation of a further component, the electronic controller is configured to issue a notification of information related to actuation restriction with a notification unit.

The human-powered vehicle control device according to the sixteenth aspect issues a notification of information related to actuation restriction of at least one of the electric brake device and the component with the notification unit in a case where actuation of at least one of the electric brake device and the component is restricted. Thus, the rider easily recognizes the actuation restriction of at least one of the electric brake device and the component.

In accordance with a seventeenth aspect of the present disclosure, the human-powered vehicle control device according to the sixteenth aspect is configured so that the electronic controller is configured to restrict actuation of the electric brake device in accordance with a battery level of the battery. In a case where the electronic controller restricts actuation of the electric brake device in accordance with the battery level of the battery, the electronic controller is configured to issue a notification indicative of a decrease in the battery level with the notification unit.

The human-powered vehicle control device according to the seventeenth aspect restricts actuation of the electric brake device in accordance with the battery level and issues a notification of information related to a decrease in the battery level with the notification unit. Thus, the rider easily recognizes the decrease in the battery level.

In accordance with an eighteenth aspect of the present disclosure, the human-powered vehicle control device according to any one of the first to seventeenth aspects is configured so that the electric brake device includes at least one of a front electric brake device and a rear electric brake device.

In the human-powered vehicle control device according to the eighteenth aspect, the electric brake device includes at least one of a front electric brake device and a rear electric brake device. Thus, at least one of the front electric brake device and the rear electric brake device is controlled in a preferred manner.

In accordance with a nineteenth aspect of the present disclosure, the human-powered vehicle control device according to any one of the first to eighteenth aspects is configured so that the component includes at least one of a motor of a transmission, a drive unit, a front lamp, a rear lamp, an adjustable seatpost device, a suspension device, a display device, an audio device, a grip heater, a seat heater, a wireless communication device, a front image capturing device, and a rear image capturing device.

The control human-powered vehicle device according to the nineteenth aspect includes at least one of a motor of a transmission, a drive unit, a front lamp, a rear lamp, an adjustable seatpost device, a suspension device, a display device, an audio device, a grip heater, a seat heater, a wireless communication device, a front image capturing device, and a rear image capturing device that is supplied with electric power from the common battery. At least one of the components is controlled in a preferred manner.

The human-powered vehicle control device for a human-powered vehicle according to the present disclosure controls the electric brake device in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
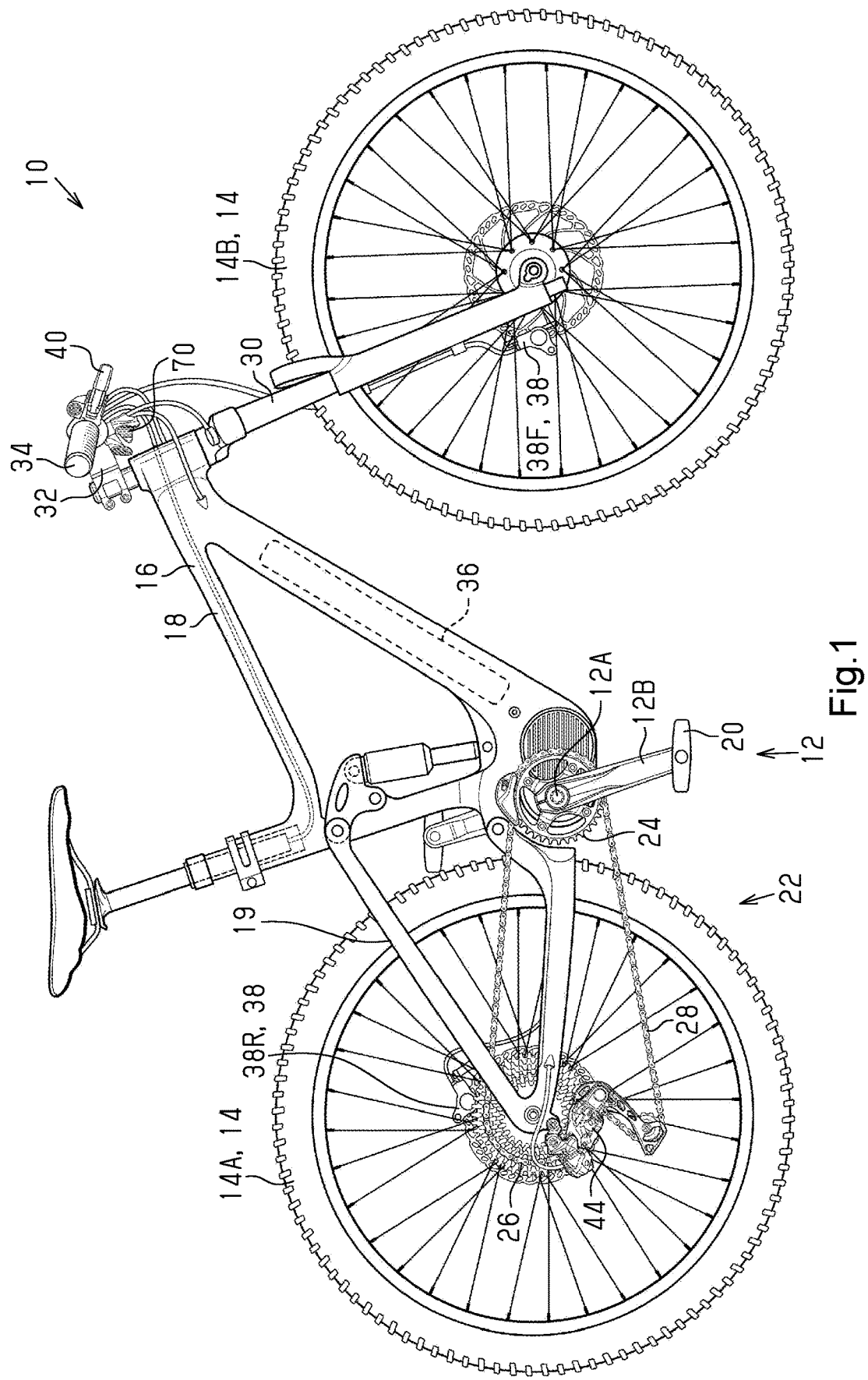
FIG. 1 is a side elevational view of a human-powered vehicle including a human-powered vehicle control device for a human-powered vehicle in accordance with one illustrative embodiment.
Figure 2:
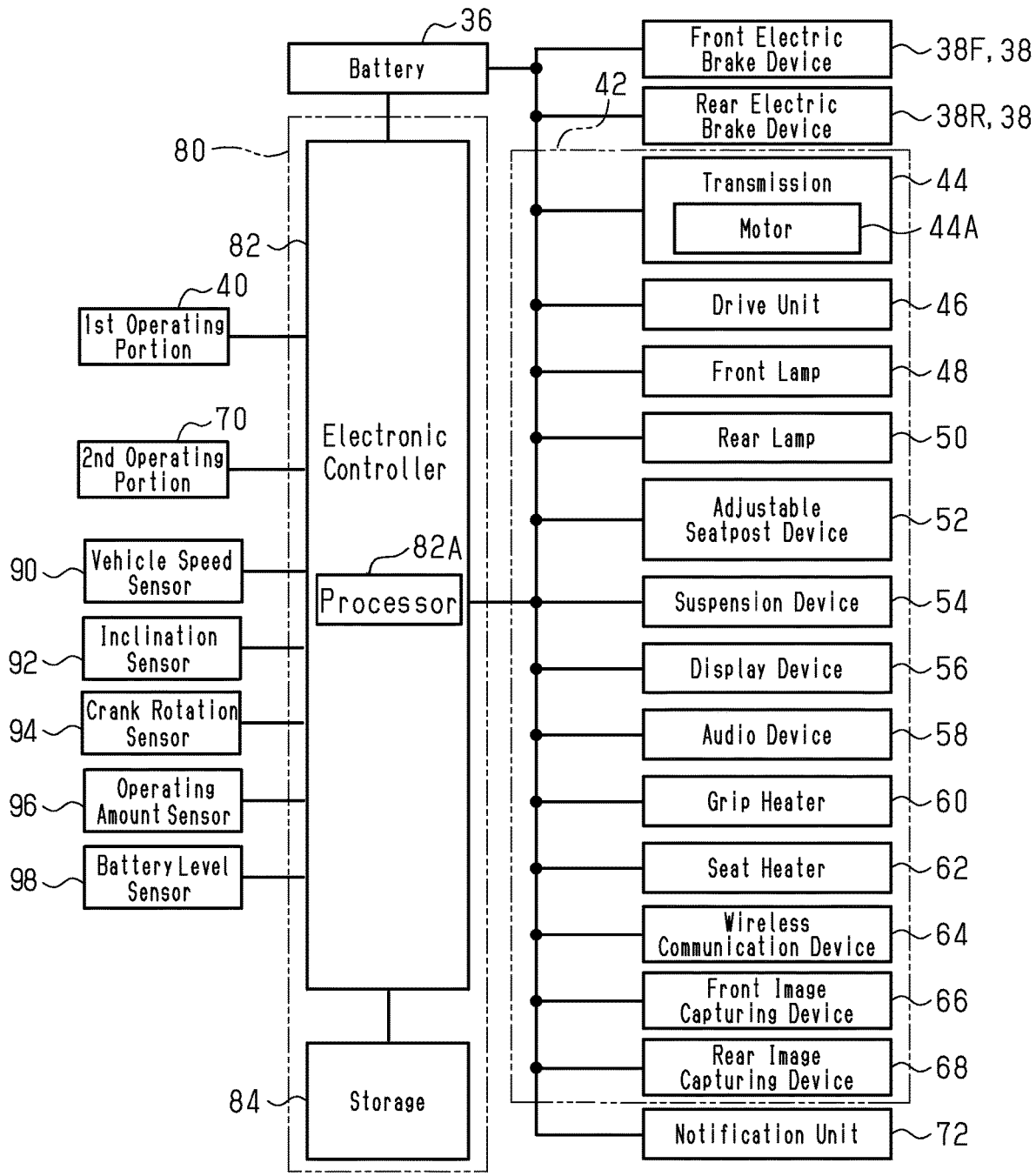
FIG. 2 is a block diagram showing the electrical configuration of the human-powered vehicle including the human-powered vehicle control device of the embodiment shown in FIG. 1.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

EMBODIMENT

An embodiment of a human-powered vehicle control device 80 for a human-powered vehicle will now be described with reference to FIGS. 1 to 9. Hereinafter, the human-powered vehicle control device 80 will be referred to as "the control device 80" for the sake of brevity. A human-powered vehicle 10 is a vehicle including at least one wheel and driven by at least human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by human driving force H. The human-powered vehicle 10 includes an E-bike that uses driving force of an electric motor in addition to the human driving force H for propulsion. The E-bike includes an electric assist bicycle that assists propulsion with an electric motor. In the embodiment described below, the human-powered vehicle 10 refers to a bicycle.

The human-powered vehicle 10 includes a crank 12 into which the human driving force H is input. The human-powered vehicle 10 further includes a wheel 14 and a vehicle body 16. Here, in the illustrated embodiment, the wheel 14 of the human-powered vehicle 10 includes a rear wheel 14A and a front wheel 14B. The vehicle body 16 includes a frame 18 and a swingarm 19 that is supported by the frame 18 in a relatively movable manner. The crank 12 includes a crank axle 12A configured to rotate relative to the frame 18 and crank arms 12B provided on opposite axial ends of the crank axle 12A. Two pedals 20 are respectively coupled to the two crank arms 12B. The rear wheel 14A is driven in accordance with rotation of the crank 12. The rear wheel 14A is supported by the swingarm 19. The crank 12 is joined to the rear wheel 14A by a drive mechanism 22. The drive mechanism 22 includes a first rotary body 24 coupled to the crank axle 12A. The crank axle 12A and the first rotary body 24 can be coupled so as to rotate integrally with each other or can be coupled via a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, at least one of the rear wheel 14A and the front wheel 14B can be coupled to the crank 12 by the drive mechanism 22.

The human-powered vehicle 10 further includes a battery 36 which is an example of an electrical energy storage. The battery 36 can include one or more battery elements. The battery elements include rechargeable battery elements. The battery 36 is configured to supply electric power to the control device 80. Preferably, the battery 36 is connected to an electronic controller 82 of the control device 80 to perform wired or wireless communication with the electronic controller 82. The term "electronic controller" as used herein refers to hardware that executes a software program, and does not include a human. Hereinafter, the electronic controller 82 will be referred to as "the controller 82" for the sake of brevity. The battery 36 is configured to communicate with the controller 82 through, for example, power line communication (PLC), a controller area network (CAN), or a universal asynchronous receiver/transmitter (UART). In an example, the battery 36 is mounted on a battery holder provided on the frame 18 or a rear carrier.

The human-powered vehicle 10 further includes an electric brake device 38. The electric brake device 38 is provided to apply a brake to a wheel portion of the wheel 14. The electric brake device 38 includes an electric actuator. The electric actuator includes, for example, an electric motor. The electric brake device 38 includes, for example, at least one of a rim brake, a roller brake, and a disc brake. The electric brake device 38 can be configured to actuate a friction member contactable with the wheel portion using an electric actuator. The electric brake device 38 can be hydraulic and control hydraulic pressure of the electric brake device 38 using an electric actuator. The electric brake device 38 can be configured to move a cable connected to the friction member using an electric actuator.

Preferably, the electric brake device 38 includes at least one of the front electric brake device 38F and the rear electric brake device 38R. The front electric brake device 38F is provided to apply a brake to the wheel portion of the front wheel 14B. The front electric brake device 38F includes an electric actuator. Actuation of the electric actuator applies braking force to the wheel portion of the front wheel 14B. The rear electric brake device 38R includes an electric actuator. The rear electric brake device 38R is provided to apply a brake to the wheel portion of the rear wheel 14A. Actuation of the electric actuator applies braking force to the wheel portion of the rear wheel 14A.

The electric brake device 38 can include only one of the front electric brake device 38F and the rear electric brake device 38R. In this case, a manual brake device can be provided in lieu of the other one of the front electric brake device 38F and the rear electric brake device 38R.

Preferably, the human-powered vehicle 10 further includes a first operating portion 40, which can also be referred to as a user input. The first operating portion 40 is provided to operate the electric brake device 38. The first operating portion 40 is, for example, provided on the handlebar 34. Here, the first operating portion 40 is a brake lever that is pivotally mounted relative to the handlebar 34. The controller 82 of the control device 80 is configured to at least receive an operating signal from the first operating portion 40. Preferably, the first operating portion 40 and the controller 82 are configured to communicate with each other. In the present embodiment, the first operating portion 40 and the controller 82 are connected by a power line. The first operating portion 40 is supplied with electric power from the battery 36. The controller 82 is configured to perform power line communication with the first operating portion 40. The first operating portion 40 and the controller 82 can be configured to include a wireless communication unit and perform wireless communication unit with each other. In this case, the first operating portion 40 is provided with a power supply that differs from the battery 36. The first operating portion 40 outputs an operating signal corresponding to an input operation to the controller 82. The controller 82 controls the electric brake device 38 in accordance with the operating signal. In a case where the electric brake device 38 includes the front electric brake device 38F and the rear electric brake device 38R, it is preferred that the first operating portion 40 includes a first operating portion 40 corresponding to the front electric brake device 38F and a first operating portion 40 corresponding to the rear electric brake device 38R.

The human-powered vehicle 10 includes at least one human-powered vehicle component 42. Here, the human-powered vehicle 10 includes a plurality of human-powered vehicle components 42. The human-powered vehicle components 42 differs from an electric brake device. In other words, as used herein the terms "human-powered vehicle component", "vehicle component", and "component" do not include an electric brake device. The electric brake device 38 and the human-powered vehicle components 42 are supplied with electric power from the common battery 36. The human-powered vehicle components 42 differ from the electric brake device 38. Here, the human-powered vehicle components 42 includes at least one of a motor 44A of a transmission 44, a drive unit 46, a front lamp 48, a rear lamp 50, an adjustable seatpost device 52, a suspension device 54, a display device 56, an audio device 58, a grip heater 60, a seat heater 62, a wireless communication device 64, a front image capturing device 66, and a rear image capturing device 68.

Preferably, the human-powered vehicle 10 further includes a second operating portion 70, which can also be referred to as a user input. The second operating portion 70 is provided to operate at least one of the human-powered vehicle components 42. The second operating portion 70 is, for example, provided on the handlebar 34. Here, the second operating portion 70 is a lever that is pivotally mounted relative to the handlebar 34. The controller 82 of the control device 80 is configured to at least receive an operating signal from the second operating portion 70. Preferably, the second operating portion 70 and the controller 82 are configured to communicate with each other. In the present embodiment, the second operating portion 70 and the controller 82 are connected by a power line. The second operating portion 70 is supplied with electric power from the battery 36. The controller 82 is configured to perform power line communication with the second operating portion 70. The second operating portion 70 and the controller 82 can be configured to include a wireless communication unit and perform wireless communication with each other. In this case, the second operating portion 70 is provided with a power supply that differs from the battery 36. The second operating portion 70 outputs an operating signal corresponding to an input operation to the controller 82. The controller 82 controls the human-powered vehicle component(s) 42 in accordance with the operating signal. In a case where the human-powered vehicle component 42 includes a plurality of human-powered vehicle components 42, it is preferred that the second operating portion 70 includes a second operating portion, similar to the second operating portion 70, corresponding to each of the human-powered vehicle components 42.

Preferably, the battery 36, the controller 82 of the control device 80, the electric brake device 38, and the human-powered vehicle components 42 are electrically connected in parallel. The battery 36 can be directly electrically connected to the human-powered vehicle components 42. The battery 36 is connected to the controller 82 of the control device 80, the electric brake device 38, and the human-powered vehicle components 42 by, for example, power line communication.

The transmission 44 changes a transmission ratio RA, that is, the ratio of rotational speed NW of the wheel 14 to rotational speed N of the crank 12 of the human-powered vehicle 10. The transmission ratio RA is a ratio of rotational speed of a driving wheel to the rotational speed N of the crank 12. In the present embodiment, the driving wheel is the rear wheel 14A. The transmission 44 includes, for example, at least one of a front derailleur, a rear derailleur, and an internal transmission device. In a case where the transmission 44 includes an internal transmission device, the internal transmission device is provided, for example, on a hub of the rear wheel 14A. The transmission 22B is configured to be actuated by an actuator. The actuator includes an electric actuator. The actuator includes, for example, the motor 44A. In a case where the human-powered vehicle components 42 includes the motor 44A of the transmission 44, the operating signal of the second operating portion 70 includes an upshift signal that increases the transmission ratio RA with the transmission 44 and a downshift signal that decreases the transmission ratio RA with the transmission 44.

The front lamp 48 is, for example, configured to be attached to the front fork 30 or the handlebar 34 and illuminates the front of the human-powered vehicle 10. The rear lamp 50 is, for example, configured to be attached to a seatpost and illuminates the rear of the human-powered vehicle 10. In a case where the human-powered vehicle components 42 includes the front lamp 48, the operating signal of the second operating portion 70 includes a lamp activation signal that activates the front lamp 48 and a lamp deactivation signal that deactivates the front lamp 48. In a case where the human-powered vehicle components 42 includes the rear lamp 50, the operating signal of the second operating portion 70 includes a lamp activation signal that activates the rear lamp 50 and a lamp deactivation signal that deactivates the rear lamp 50.

The adjustable seatpost device 52 includes at least one of a mechanism that adjusts a seat height, a mechanism that adjusts a seat front-rear position, and a mechanism that adjusts a seat angle. The adjustable seatpost device 52 includes an electric actuator. Actuation of the electric actuator changes at least one of the seat height, the seat front-rear position, and the seat angle. In a case where the human-powered vehicle components 42 includes the adjustable seatpost device 52 that includes the mechanism adjusting the seat height, the operating signal of the second operating portion 70 includes a signal for adjusting the seat height. In a case where the human-powered vehicle components 42 includes the adjustable seatpost device 52 that includes the mechanism adjusting the seat front-rear position, the operating signal of the second operating portion 70 includes a signal for moving the seat front-rear position. In a case where the human-powered vehicle components 42 include the adjustable seatpost device 52 that includes the mechanism adjusting the seat angle, the operating signal of the second operating portion 70 includes a signal for changing the seat angle.

The suspension device 54 includes at least one of a mechanism that switches between activation and deactivation of a suspension, a mechanism that switches the height of the suspension, and a mechanism that switches damping force of the suspension. The suspension device 54 includes an electric actuator. Actuation of the electric actuator changes at least one of activation and deactivation of the suspension function, the height of the suspension, and the damping force of the suspension. The suspension device 54 can be a hydraulic type or a pneumatic type. In a case where the human-powered vehicle components 42 includes the suspension device 54 including the mechanism switching between activation and deactivation of the suspension, the operating signal of the second operating portion 70 includes a signal for switching between activation and deactivation of the suspension. In a case where the human-powered vehicle components 42 includes the suspension device 54 including the mechanism switching the height of the suspension, the operating signal of the second operating portion 70 includes a signal for switching the height of the suspension. In a case where the human-powered vehicle components 42 includes the suspension device 54 including the mechanism switching the damping force of the suspension, the operating signal of the second operating portion 70 includes a signal for switching the damping force of the suspension.

The display device 56 is, for example, configured to be attached to the handlebar 34 and shows at least one of a traveling condition of the human-powered vehicle 10, a surrounding environment, the battery level of the battery 36, a state of the human-powered vehicle components 42, and an operation of the second operating portion 70. The display device 56 can be integrated with the second operating portion 70. In a case where the human-powered vehicle components 42 includes the display device 56, the operating signal of the second operating portion 70 can include a signal for switching on or off the second operating portion 70 or a signal for switching the display content.

The audio device 58 is, for example, configured to be attached to the handlebar 34. The audio device 58 can be configured to issue a sound notification to the user. For example, the audio device 58 is a buzzer. In a case where the human-powered vehicle components 42 include the audio device 58, the operating signal of the second operating portion 70 can include a signal for switching whether to issue a notification with the audio device 58.

The grip heater 60 includes a heater provided on a grip and heats the grip with electric power supplied to the heater. An example of the heater is a film heater. In a case where the human-powered vehicle components 42 include the grip heater 60, the operating signal of the second operating portion 70 includes a signal for switching on or off the grip heater 60.

The seat heater 62 includes a heater provided on the seat and heats the seat with electric power supplied to the heater. An example of the heater is a heating wire. In a case where the human-powered vehicle components 42 include the seat heater 62, the operating signal of the second operating portion 70 includes a signal for switching on or off the seat heater 62.

The wireless communication device 64 is, for example, configured to communicate with the control device 80 of the human-powered vehicle and an external wireless communication device that is not supplied with electric power from the battery 36. The wireless communication device 64 includes at least one of a wireless transmitter and a wireless receiver. In a case where the human-powered vehicle components 42 include the wireless communication device 64, the operating signal of the second operating portion 70 can include a signal for switching on or off the wireless communication device 64.

The front image capturing device 66 is, for example, configured to be attached to the handlebar 34 and captures an image of the front of the human-powered vehicle 10. The rear image capturing device 68 is, for example, configured to be attached to the seatpost and captures an image of the rear of the human-powered vehicle 10. The front image capturing device 66 and the rear image capturing device 68 capture at least one of a still image and a moving image and store image signals in a predetermined format together with sound. The front image capturing device 66 and the rear image capturing device 68 are configured to output the image signals through wired or wireless communication. In a case where the human-powered vehicle components 42 include the front image capturing device 66, the operating signal of the second operating portion 70 can include a signal for switching on or off the front image capturing device 66, a signal for starting to capture an image with the front image capturing device 66, and a signal for stopping the front image capturing device 66 from capturing the image. In a case where the human-powered vehicle components 42 include the rear image capturing device 68, the operating signal of the second operating portion 70 can include a signal for switching on or off the rear image capturing device 68, a signal for starting to capture an image with the rear image capturing device 68, and a signal for stopping the rear image capturing device 68 from capturing the image.

Preferably, the human-powered vehicle 10 further includes a notification unit 72. The notification unit 72 includes a display. The display includes, for example, a display panel. The display includes, for example, at least one of a portable electronic device, a display unit, a smartphone, a tablet computer, and a cycle computer. The notification unit 72 can include a speaker. The notification unit 72 can be formed integrally with the audio device 58.

The control device 80 includes the controller 82. The controller 82 includes at least one processor 82A such as an arithmetic processing unit that executes a predetermined control program. Each processor includes, for example, a central processing unit (CPU) or a micro processing unit (MPU). When the controller 82 has more than one processor 82A, the processors can be provided at the same location (e.g., a single circuit board) or at one or more different positions that are separate from each other. Thus, the controller 82 can include one or more microcomputers. Preferably, the control device 80 further includes a storage 84. The storage 84 stores various control programs and information used for various control processes. The storage 84 can be any a non-transitory computer readable medium. The storage 84 includes, for example, a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The controller 82 controls the electric brake device 38 and the human-powered vehicle components 42 which are different from the electric brake device 38.

The controller 82 controls the electric brake device 38 and the human-powered vehicle components 42 which are different from the electric brake device 38 to give actuation priority to the electric brake device 38 over the human-powered vehicle component(s) 42.

Preferably, the controller 82 actuates the electric brake device 38 in a case where at least one of a traveling environment of the human-powered vehicle 10, a traveling state of the human-powered vehicle 10, and an operation state of the electric brake device 38 is in a first condition. In addition, the controller 82 actuates the human-powered vehicle components 42 in a case where at least one of the traveling environment of the human-powered vehicle 10 and the traveling state of the human-powered vehicle 10 is in a second condition.

Preferably, in the first condition, a condition for generating braking force with the electric brake device 38 is satisfied. The traveling environment of the human-powered vehicle 10 and the traveling state of the human-powered vehicle 10 include, for example, at least one of vehicle speed of the human-powered vehicle 10 and gradient of the road on which the human-powered vehicle 10 travels. Here, the human-powered vehicle 10 further includes a vehicle speed sensor 90 and an inclination sensor 92. The term "sensor" as used herein also refers to a hardware device or instrument designed to detect the presence of a particular object or substance and to emit a signal in response. The term "sensor" as used herein also do not include a human. The vehicle speed sensor 90 is configured to detect information related to the vehicle speed V of the human-powered vehicle 10. In the present embodiment, the vehicle speed sensor 90 is configured to detect information related to the rotational speed W of the wheels 14 of the human-powered vehicle 10. The vehicle speed sensor 90 is configured to detect, for example, a magnet provided on the front wheel 14B of the human-powered vehicle 10. The vehicle speed sensor 90 is configured to output, for example, a predetermined number of detection signals during a single rotation of the front wheel 14B. The predetermined number is, for example, one. The vehicle speed sensor 90 outputs a signal corresponding to the rotational speed of the front wheel 14B. The controller 82 can calculate the vehicle speed of the human-powered vehicle 10 from the rotational speed of the front wheel 14B and information related to the circumferential length of the front wheel 14B. The storage 84 stores information related to the circumferential length of the front wheel 14B. The vehicle speed sensor 90 includes, for example, a magnetic reed, which forms a reed switch, or a Hall element. The vehicle speed sensor 90 can be provided on the front fork 30 to detect a magnet attached to a spoke of the front wheel 14B. Alternatively, the vehicle speed sensor 90 can be attached to the swing arm 19 of the human-powered vehicle 10 and configured to detect a magnet attached to a spoke of the rear wheel 14A. The vehicle speed sensor 90 is not limited to a structure that detects a magnet provided on the wheel 14 as long as information related to the vehicle speed V of the human-powered vehicle 10 can be obtained. For example, the vehicle speed sensor 90 can be configured to detect a slit provided on a disc brake. Alternatively, the vehicle speed sensor 90 can include an optical sensor or a Global Positioning System (GPS) receiver. The vehicle speed sensor 90 is connected to the controller 82 by a wireless communication device or an electric cable. The inclination sensor 92 is configured to detect information related to an inclination angle of the human-powered vehicle 10. The inclination angle of the human-powered vehicle 10 corresponds to the pitch angle of the human-powered vehicle 10. In one example, the inclination sensor 92 includes at least one of a gyro sensor and an acceleration sensor. In another example, the inclination sensor 92 includes a Global positioning system (GPS). The controller 82 can calculate the inclination angle D of the human-powered vehicle 10 from the GPS information obtained by the GPS receiver and the gradient included in map information that is recorded in advance in the storage 84. The inclination sensor 92 is connected to the controller 82 by a wireless communication device or an electric cable. For example, in a case where the vehicle speed of the human-powered vehicle 10 is greater than or equal to a predetermined vehicle speed and a case where the gradient of the road on which the human-powered vehicle 10 travels is less than or equal to a predetermined road gradient, the controller 82 determines that the first condition is satisfied. The operation state of the electric brake device 38 includes, for example, an operation state of the first operating portion 40. For example, in a case where the first operating portion 40 is operated, the controller 82 determines that the first condition is satisfied.

Preferably, in the second condition, a condition for actuating the component(s) 42 is satisfied. The traveling environment of the human-powered vehicle 10 and the traveling state of the human-powered vehicle 10 include, for example, the rotational speed N of the crank 12 of the human-powered vehicle 10, the vehicle speed of the human-powered vehicle 10, the gradient of the road on which the human-powered vehicle 10 travels, and the luminance of the road on which the human-powered vehicle 10 travels. Here, the human-powered vehicle 10 further includes a crank rotation sensor 94. The crank rotation sensor 94 is configured to detect information related to the rotational speed of the crank axle 12A. The crank rotation sensor 94 is provided on, for example, the frame 18. The crank rotation sensor 94 includes a magnetic sensor that outputs a signal corresponding to magnetic field intensity. For example, an annular magnet of which the magnetic field intensity varies in the circumferential direction is provided on the crank axle 12A. The crank rotation sensor 94 outputs a signal corresponding to the rotational speed of the crank axle 12A. Instead of the magnetic sensor, the crank rotation sensor 94 can include an optical sensor, an acceleration sensor, a gyro sensor, or a torque sensor as long as information related to the rotational speed of the crank axle 12A can be obtained. The crank rotation sensor 94 is connected to the controller 82 by a wireless communication device or an electric cable.

Preferably, in a case where the first condition and the second condition are both satisfied, the controller 82 actuates the electric brake device 38 and restricts actuation of the human-powered vehicle component(s) 42 or actuates the electric brake device 38 and then actuates the human-powered vehicle components 42. In a case where the first condition and the second condition are both satisfied, the controller 82 actuates the electric brake device 38 and restricts actuation of the human-powered vehicle components 42 or actuates the electric brake device 38 and then actuates the human-powered vehicle component(s) 42, so that actuation priority is given to the electric brake device 38 over the component(s) 42.

Preferably, the human-powered vehicle components 42 includes a plurality components 42, and the controller 82 controls each of the components 42 in accordance with a component type of the components 42 in a case where the first condition and the second condition are both satisfied. The human-powered vehicle components 42 includes, for example, at least two of the motor 44A of the transmission 44, the drive unit 46, the front lamp 48, the rear lamp 50, the adjustable seatpost device 52, the suspension device 54, the display device 56, the audio device 58, the grip heater 60, the seat heater 62, the wireless communication device 64, the front image capturing device 66, and the rear image capturing device 68. Preferably, the second condition includes a condition corresponding to each of the components 42.

Preferably, in a case where the first condition and the second condition are both satisfied and at least one of the traveling environment of the human-powered vehicle 10 and the traveling state of the human-powered vehicle 10 is in a third condition, the controller 82 actuates the electric brake device 38 and restricts actuation of the human-powered vehicle component(s) 42 or actuates the electric brake device 38 and then actuates the human-powered vehicle component(s) 42. Preferably, in a case where the first condition and the second condition are both satisfied and at least one of the traveling environment of the human-powered vehicle 10 and the traveling state of the human-powered vehicle 10 is in a fourth condition, the controller 82 does not restrict actuation of the human-powered vehicle component 42 or simultaneously actuates the electric brake device 38 and the human-powered vehicle component(s) 42.

As used herein the term "actuating" includes "starting actuation". In a case of simultaneously actuating the electric brake device 38 and the human-powered vehicle component 42, the controller 82 starts to drive the electric actuator of the electric brake device 38 and the electric actuator of the human-powered vehicle component(s) 42 substantially at the same time. In a case of actuating the electric brake device 38 and then actuating the human-powered vehicle component(s) 42, the controller 82 can start to actuate the human-powered vehicle component(s) 42, for example, before actuation of the electric brake device 38 ends. In a case of actuating the electric brake device 38 and then actuating the human-powered vehicle component(s) 42, the controller 82 can start actuations so that a peak of an electric power usage amount E of the electric brake device 38 does not overlap a peak of an electric power usage amount of the human-powered vehicle component(s) 42 at a maximum output. In a case of actuating the electric brake device 38 and then actuating the human-powered vehicle component(s) 42, it is preferred that the controller 82 starts to actuate the electric brake device 38 and the human-powered vehicle component(s) 42 at different times so that the electric brake device 38 is stably actuated.

The state in which the first condition and the second condition are both satisfied includes the third condition and the fourth condition. Preferably, the third condition and the fourth condition are mutually exclusive. The state in which the first condition and the second condition are both satisfied can include a case where neither the third condition nor the fourth condition is satisfied in addition to the third condition and the fourth condition. In a case where the first condition and the second condition are both satisfied and neither the third condition nor the fourth condition is satisfied, the controller 82 can execute control that differs from the third condition and the fourth condition. For example, in a case where the third condition is satisfied, the controller 82 actuates the electric brake device 38 and restricts the human-powered vehicle component(s) 42 to a first restriction state, and in a case where neither the third condition nor the fourth condition is satisfied, the controller 82 actuates the electric brake device 38 and restricts the human-powered vehicle component(s) 42 to a second restriction state. In the second restriction state, for example, restriction on the amount of electric power supplied to the human-powered vehicle component(s) 42 is less than in the first restriction state. In other words, in the second restriction state, the amount of electric power supplied to the human-powered vehicle component(s) 42 is less than in a case where no restriction is imposed, and is greater than in the first restriction state. In a case of actuating the electric brake device 38 and then actuating the human-powered vehicle component(s) 42, in the second restriction state, for example, the interval between the actuation start time of the electric brake device 38 and the actuation start time of the human-powered vehicle component(s) 42 is less than in the first restriction state. The second restriction state can be the same as the first restriction state. For example, in a case where the human-powered vehicle component(s) 42 performs a switching action, the controller 82 does not actuate the human-powered vehicle component(s) 42 in any of the first restriction state and the second restriction state.

For example, each of the third condition and the fourth condition is related to at least one of the electric power usage amount E of the electric brake device 38, required braking force R of the electric brake device 38, a battery level B of the battery 36, and a parameter related to a vehicle kinetic state of the human-powered vehicle 10. In a case where the human-powered vehicle components 42 includes a plurality of the components 42, for example, at least one of the electric power usage amount E of the electric brake device 38, the required braking force R of the electric brake device 38, the battery level B of the battery 36, and the parameter P related to the vehicle kinetic state of the human-powered vehicle 10 corresponding to the third condition and the fourth condition can be set for each component type of the components 42.

The controller 82 calculates the electric power usage amount E of the electric brake device 38, for example, based on the required braking force R generated with the electric brake device 38. The controller 82 calculates the electric power usage amount E, for example, based on information stored in the storage 84 in advance that associates the required braking force R with the electric power usage amount E. The required braking force R generated with the electric brake device 38 is determined, for example, based on an operation amount of the first operating portion 40, the vehicle speed of the human-powered vehicle 10, and the gradient of the road on which the human-powered vehicle 10 travels. Here, the human-powered vehicle 10 further includes an operating amount sensor 96. The operating amount sensor 96 is configured to detect information related to an operating amount of the first operating portion 40 by a user. The operating amount sensor 96 can be provided on the first operating portion 40. The operating amount sensor 96 can include, for example, a magnetic sensor, a potentiometer, a rotary encoder, a linear encoder, or an optical sensor. The operating amount sensor 96 is connected to the controller 82 by a wireless communication device or an electric cable. Also, here, the human-powered vehicle 10 further includes a battery level sensor 98. The battery level sensor 98 is configured to detect information related to the battery level or capacity of the battery 36. The battery level sensor 98 is electrically connected to the battery 36. The battery level sensor 98 can include, for example, a voltmeter that measures the terminal voltage of the battery 36. The battery level sensor 98 is connected to the controller 82 by a wireless communication device or an electric cable.

The electric power usage amount E can be calculated based on the required braking force R and can differ from the electric power usage amount that corresponds to an actual braking force. In a case where the electric power usage amount E calculated based on the required braking force R is greater than a predetermined threshold value, the controller 82 can change the actual electric power usage amount to be less than or equal to the predetermined threshold value. In a case where the required braking force R is greater than a predetermined braking force, the controller 82 can change the required braking force R to be less than or equal to the predetermined braking force and calculate the actual electric power usage amount based on the changed required braking force R. The predetermined threshold value and the predetermined braking force can be determined based on the capacity of the battery 36 or can be determined based on the capacity of a power supply line that connects the battery 36 and the electric brake device 38.

The controller 82 executes, for example, one of the first to fifth examples.

In the first example, the third condition includes a case where the electric power usage amount E of the electric brake device 38 is greater than a first electric power usage amount E1. The fourth condition includes a case where the electric power usage amount E of the electric brake device 38 is less than or equal to a third electric power usage amount E3. The first electric power usage amount E1 can be different from or the same as the third electric power usage amount E3. The first electric power usage amount E1 and the third electric power usage amount E3 are set, for example, in accordance with a maximum electric power EX that can be supplied from the battery 36 to the electric brake device 38 and the component(s) 42. The first electric power usage amount E1 is set to a value that is, for example, less than the maximum electric power EX and is less than or equal to a value obtained by subtracting the maximum electric power usage amount of the component(s) 42 from the maximum electric power EX. The third electric power usage amount E3 is set to a value that is, for example, less than the maximum electric power EX and is less than or equal to a value obtained by subtracting the maximum electric power usage amount of the electric brake device 38 from the maximum electric power EX. The electric power usage amount E can be a voltage value or a current value. The maximum electric power EX can be determined based on the capacity of the battery 36 or the capacity of a power supply line that connects the battery 36 to the electric brake device 38 and the human-powered vehicle component(s) 42.

Figure 3:
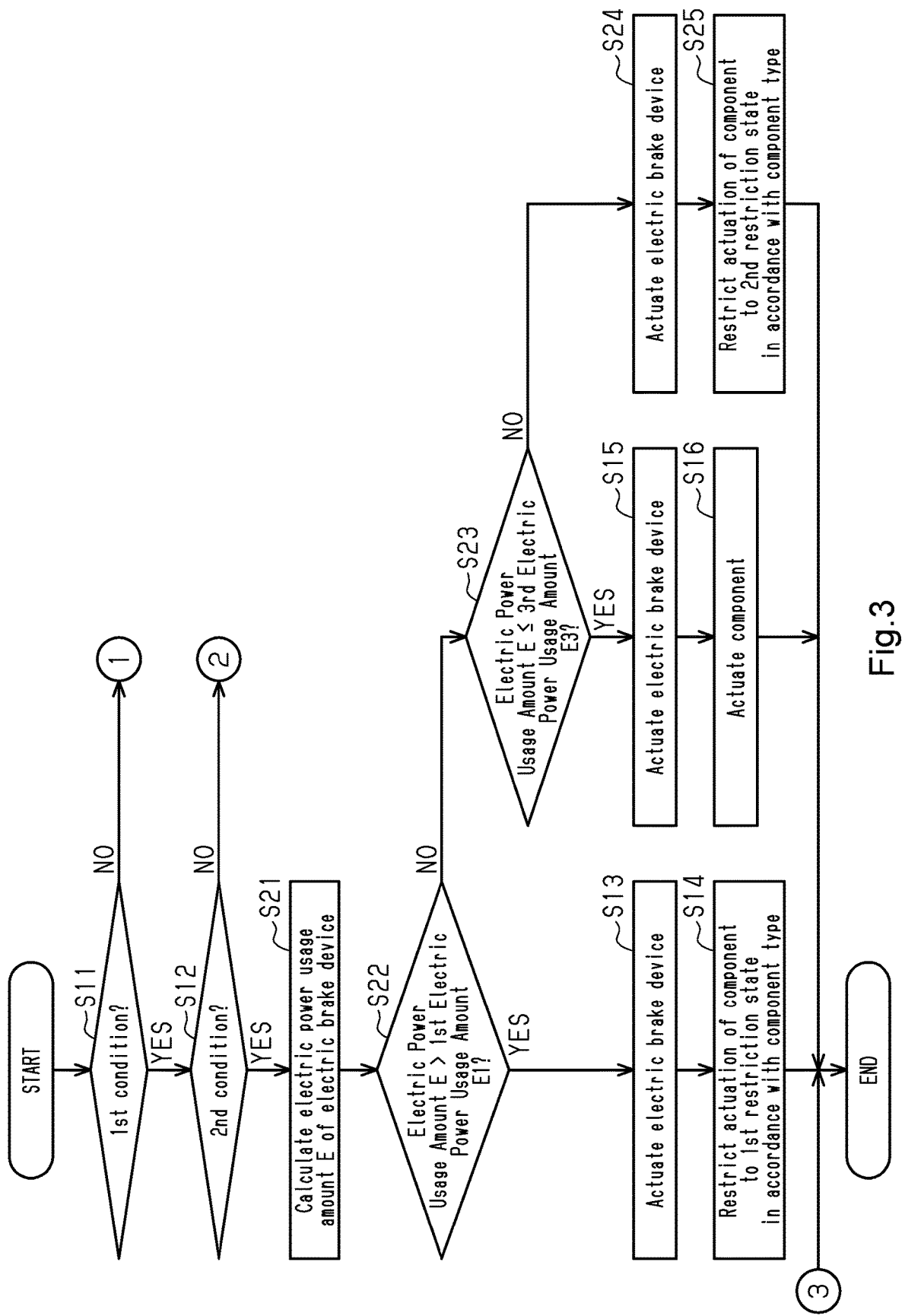
FIG. 3 is a flowchart showing a first part of a first example of a process of the electronic controller shown in FIG. 2 for controlling an electric brake device and a component of the human-powered vehicle.
Figure 4:
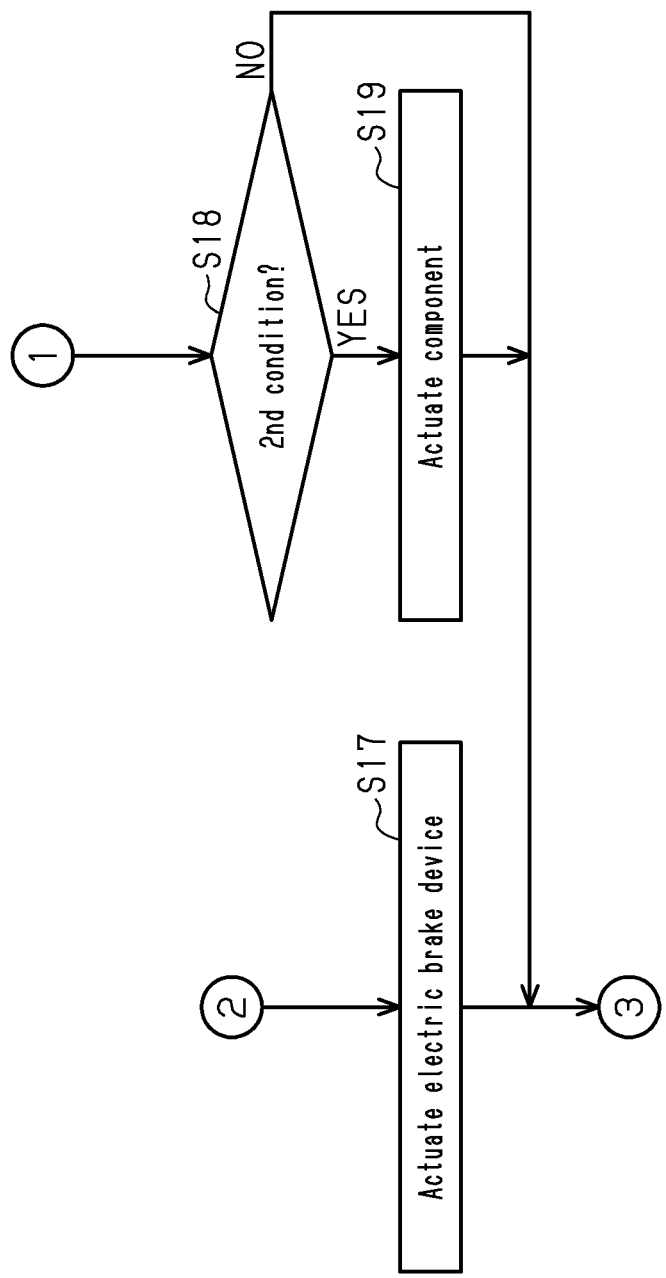
FIG. 4 is a flowchart showing a second part of the first example of the process of the electronic controller shown in FIG. 2 for controlling the electric brake device and the component of the human-powered vehicle.

The first example of a process executed by the controller 82 will now be described with reference to FIGS. 3 and 4. In a case where electric power is supplied to the controller 82, the controller 82 starts the process and proceeds to step S11 of the flowchart illustrated in FIG. 3. Upon completion of the flowcharts illustrated in FIGS. 3 and 4, the controller 82 repeats the process from step S11 in predetermined cycles until the supply of electric power is stopped.

In step S11, the controller 82 determines whether the first condition is satisfied. The controller 82 determines whether the first condition is satisfied, for example, based on at least one of the traveling environment of the human-powered vehicle 10, the traveling state of the human-powered vehicle 10, and the operation state of the first operating portion 40. The controller 82 determines that the first condition is satisfied, for example, in a case where the traveling environment of the human-powered vehicle 10, the traveling state of the human-powered vehicle 10, and the operation state of the first operating portion 40 correspond to a condition for actuating the electric brake device 38.

In a case where the determination result of step S11 is affirmative, the controller 82 proceeds to step S12. In step S12, the controller 82 determines whether the second condition is satisfied. The controller 82 determines whether the second condition is satisfied, for example, based on at least one of the traveling environment of the human-powered vehicle 10, the traveling state of the human-powered vehicle 10, and the operation state of the second operating portion 70.

In a case where the determination result of step S12 is affirmative, the controller 82 proceeds to step S21. In step S21, the controller 82 calculates the electric power usage amount E of the electric brake device 38. In step S22, the controller 82 determines whether the electric power usage amount E of the electric brake device 38 is greater than the first electric power usage amount E1. In a case where the determination result of step S22 is affirmative, the controller 82 proceeds to step S13. In step S13, the controller 82 actuates the electric brake device 38 and proceeds to step S14. The order of steps S13 and S14 can be inverted. Steps S13 and S14 can be at least partially executed at the same time.

In step S14, the controller 82 restricts actuation of the human-powered vehicle component(s) 42 to the first restriction state in accordance with the type of the human-powered vehicle component(s) 42 and then ends the process. For example, in a case where the human-powered vehicle component(s) 42 performs a switching action, the controller 82 does not actuate the human-powered vehicle component(s) 42 so that the actuation is restricted to the first restriction state. In a case where an actuation amount of the human-powered vehicle component(s) 42 varies in accordance with the electric power usage amount, the controller 82 decreases the electric power usage amount so that the actuation is restricted to the first restriction state. For example, in a case where the human-powered vehicle component(s) 42 is the motor 44A of the transmission 44, in step S14, the controller 82 does not actuate the motor 44A of the transmission 44 so that actuation of the human-powered vehicle component(s) 42 is restricted to the first restriction state. For example, in a case where the human-powered vehicle component(s) 42 is the motor 44A of the transmission 44, in step S14, the controller 82 decreases at least one of actuation speed or actuation torque of the motor 44A of the transmission 44 as compared to a case where no restriction is imposed on actuation of the motor 44A of the transmission 44, so that actuation of the human-powered vehicle component(s) 42 is restricted to the first restriction state. For example, in a case where the human-powered vehicle component(s) 42 is the front lamp 48, the controller 82 controls the front lamp 48 so that the illuminance of the front lamp 48 becomes less than or equal to a predetermined first illuminance. Thus, actuation of the human-powered vehicle component(s) 42 is restricted to the first restriction state. Preferably, the first restriction state is suitable for controlling the human-powered vehicle component(s) 42.

In a case where the determination result of step S22 is negative, the controller 82 proceeds to step S23. In step S23, the controller 82 determines whether the electric power usage amount E of the electric brake device 38 is less than or equal to the third electric power usage amount E3.

In a case where the determination result of step S23 is negative, the controller 82 proceeds to step S24. In step S24, the controller 82 actuates the electric brake device 38 and proceeds to step S25. In step S25, the controller 82 restricts actuation of the human-powered vehicle component(s) 42 to the second restriction state in accordance with the type of the human-powered vehicle component(s) 42 and then ends the process. For example, in a case where the human-powered vehicle component(s) 42 performs a switching action, the controller 82 does not actuate the human-powered vehicle component(s) 42 so that the actuation is restricted to the second restriction state. In a case where an actuation amount of the human-powered vehicle component(s) 42 varies in accordance with the electric power usage amount, the controller 82 decreases the electric power usage amount so that the actuation is restricted to the second restriction state. For example, in a case where the human-powered vehicle component 42 is the motor 44A of the transmission 44, in step S25, the controller 82 does not actuate the motor 44A of the transmission 44 so that actuation of the human-powered vehicle component 42 is restricted to the second restriction state. For example, in a case where the human-powered vehicle component 42 is the motor 44A of the transmission 44, in step S25, the controller 82 decreases at least one of actuation speed or actuation torque of the motor 44A of the transmission 44 to be less than a case where no restriction is imposed on actuation of the motor 44A of the transmission 44 but not less than a case where the actuation is restricted to the first restriction state. Thus, actuation of the human-powered vehicle component(s) 42 is restricted to the second restriction state. For example, in a case where the human-powered vehicle component 42 is the front lamp 48, the controller 82 controls the front lamp 48 so that the illuminance of the front lamp 48 becomes less than or equal to a predetermined second illuminance. Thus, actuation of the human-powered vehicle component 42 is restricted to the second restriction state. Preferably, the predetermined second illuminance is greater than the predetermined first illuminance.

In a case where the determination result of step S23 is affirmative, the controller 82 proceeds to step S15. In step S15, the controller 82 actuates the electric brake device 38 and proceeds to step S16. In step S16, the controller 82 actuates the human-powered vehicle component(s) 42 and ends the process. The order of steps S15 and S16 can be inverted. Steps S15 and S16 can be at least partially executed at the same time.

In a case where the determination result of step S12 is negative, the controller 82 proceeds to step S17. In step S17, the controller 82 actuates the electric brake device 38 and ends the process.

In a case where the determination result of step S11 is negative, the controller 82 proceeds to step S18. In step S18, the controller 82 determines whether the second condition is satisfied. For example, in the same manner as step S12, the controller 82 determines whether the second condition is satisfied. In a case where the determination result of step S18 is negative, the controller 82 ends the process. In a case where the determination result of step S18 is affirmative, the controller 82 proceeds to step S19. In step S19, the controller 82 actuates the human-powered vehicle component(s) 42 and ends the process.

In the second example, the third condition includes a case where a sum EA of the electric power usage amount E of the electric brake device 38 and the electric power usage amount of the human-powered vehicle component(s) 42 is greater than a second electric power usage amount EA2. The fourth condition includes a case where the sum EA of the electric power usage amount E of the electric brake device 38 and the electric power usage amount of the human-powered vehicle component(s) 42 is less than or equal to a fourth electric power usage amount EA4. The second electric power usage amount EA2 can be different from or the same as the fourth electric power usage amount EA4. Preferably, the second electric power usage amount EA2 and the fourth electric power usage amount EA4 are stored in the storage 84 in advance. The second electric power usage amount EA2 and the fourth electric power usage amount EA4 are set to a value that is, for example, less than or equal to the maximum electric power EX.

The second example of the process executed by the controller 82 will now be described with reference to FIGS. 4 and 5. In a case where electric power is supplied to the controller 82, the controller 82 starts the process and proceeds to step S11 of the flowchart illustrated in FIG. 5. Upon completion of the flowcharts illustrated in FIGS. 4 and 5, the controller 82 repeats the process from step S11 in predetermined cycles until the supply of electric power is stopped. The controller 82 executes steps S11, S12, S13 to S16, S24, and S25 shown in FIG. 5 in the same manner as steps S11, S12, S13 to S16, S24, and S25 shown in FIG. 3.

Figure 5:
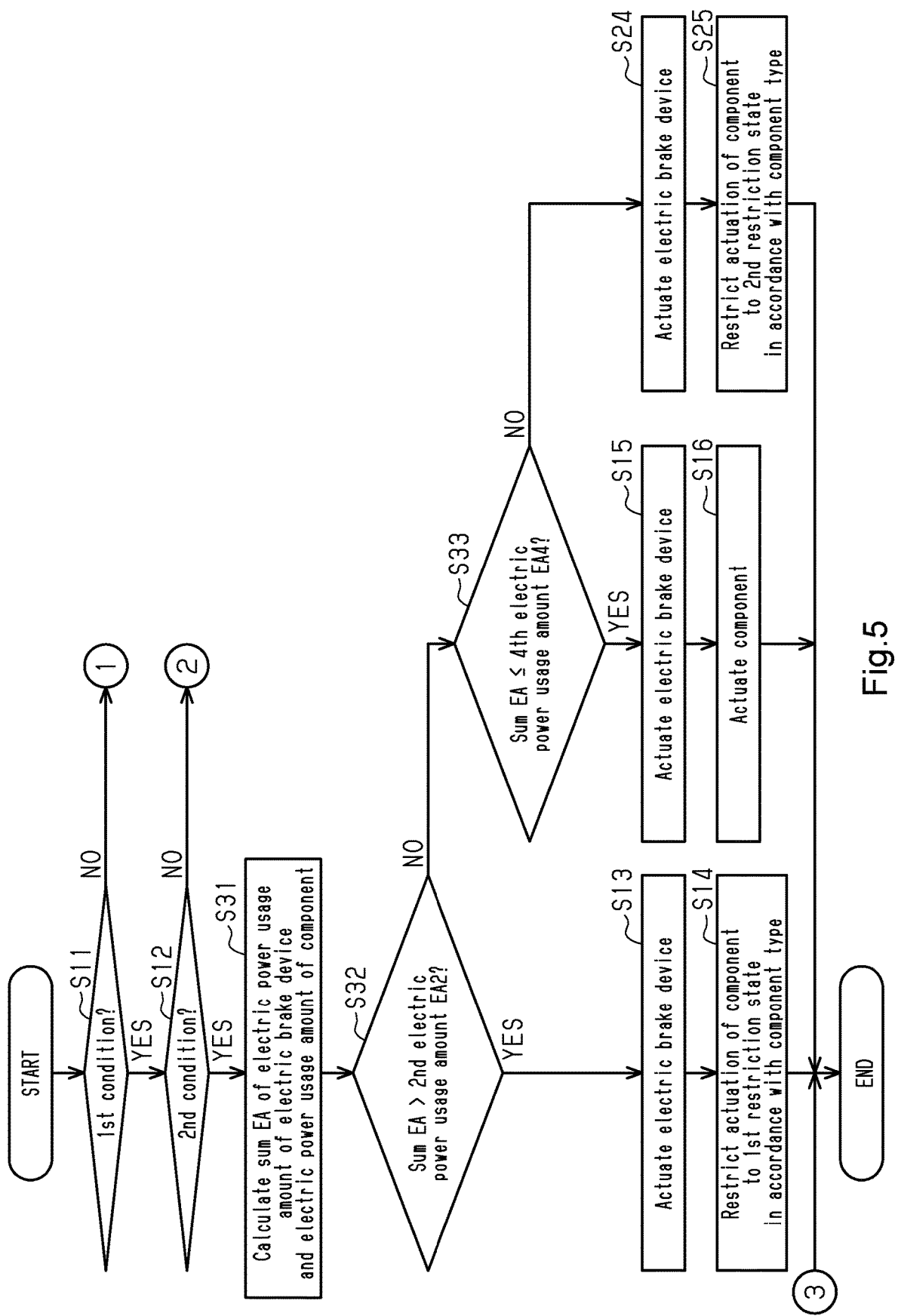
FIG. 5 is a flowchart showing a part of a second example of a process of the electronic controller shown in FIG. 2 for controlling the electric brake device and the component of the human-powered vehicle.

In FIG. 5, in a case where the determination result of step S12 is affirmative, the controller 82 proceeds to step S31. In step S31, the controller 82 calculates the sum EA of the electric power usage amount of the electric brake device 38 and the electric power usage amount of the human-powered vehicle component(s) 42. In step S32, the controller 82 determines whether the sum EA of the electric power usage amount of the electric brake device 38 and the electric power usage amount of the human-powered vehicle component(s) 42 is greater than the second electric power usage amount EA2. In a case where the determination result of step S32 is affirmative, the controller 82 proceeds to step S13.

In a case where the determination result of step S32 is negative, the controller 82 proceeds to step S33. In step S33, the controller 82 determines whether the sum EA of the electric power usage amount of the electric brake device 38 and the electric power usage amount of the human-powered vehicle component(s) 42 is less than or equal to the fourth electric power usage amount EA4. In a case where the determination result of step S33 is negative, the controller 82 proceeds to step S24. In a case where the determination result of step S33 is affirmative, the controller 82 proceeds to step S15.

In the third example, the third condition includes a case where the required braking force R is greater than a first braking force R1. The fourth condition includes a case where the required braking force R is less than or equal to a second braking force R2. The first braking force R1 can be different from or the same as the second braking force R2. Preferably, the first braking force R1 and the second braking force R2 are stored in the storage 84 in advance.

The third example of the process executed by the controller 82 will now be described with reference to FIGS. 4 and 6. In a case where electric power is supplied to the controller 82, the controller 82 starts the process and proceeds to step S11 of the flowchart illustrated in FIG. 6. Upon completion of the flowcharts illustrated in FIGS. 4 and 6, the controller 82 repeats the process from step S11 in predetermined cycles until the supply of electric power is stopped. The controller 82 executes steps S11, S12, S13 to S16, S24, and S25 shown in FIG. 6 in the same manner as steps S11, S12, S13 to S16, S24, and S25 shown in FIG. 3.

Figure 6:
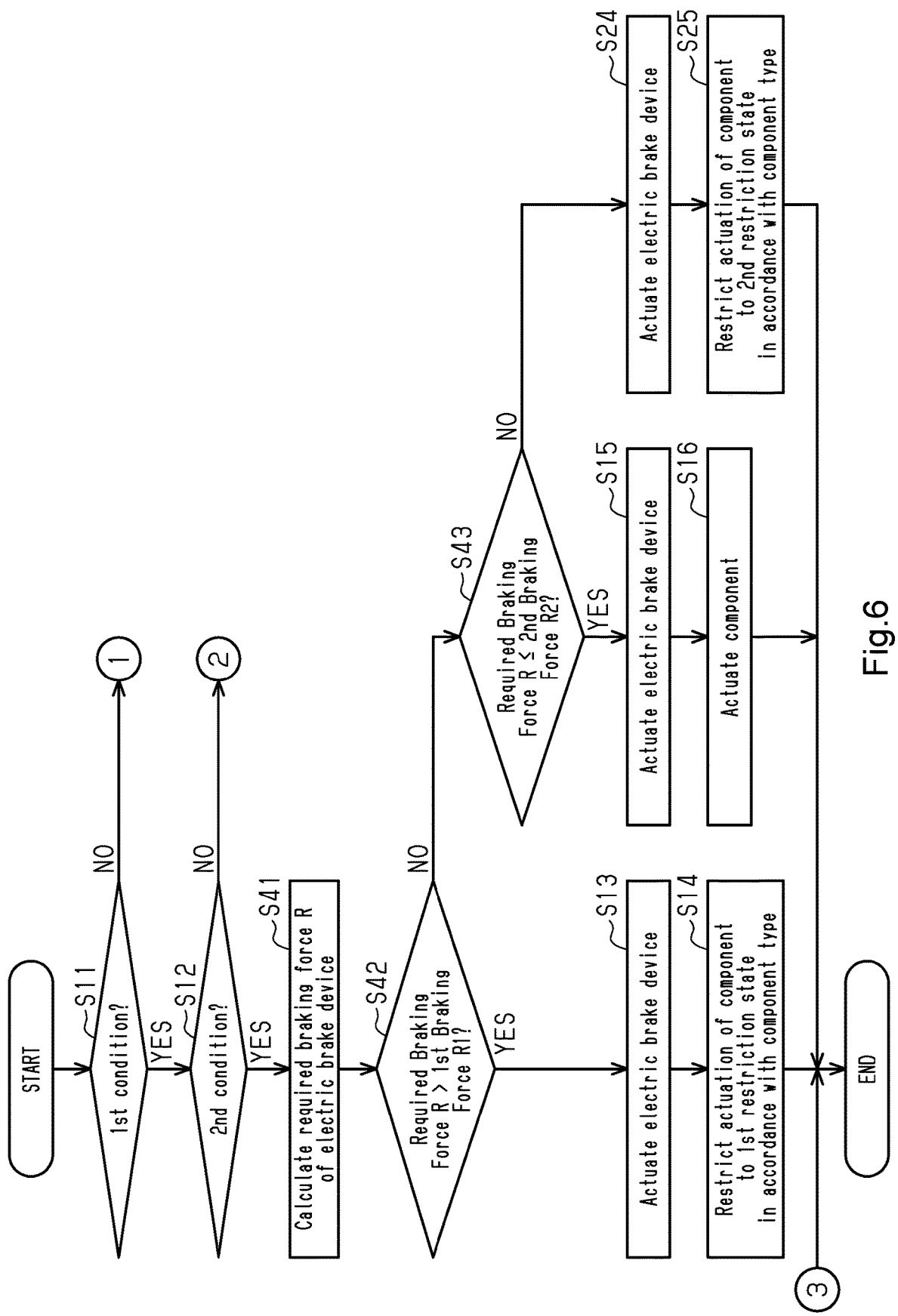
FIG. 6 is a flowchart showing a part of a third example of a process of the electronic controller shown in FIG. 2 for controlling the electric brake device and the component of the human-powered vehicle.

In FIG. 6, in a case where the determination result of step S12 is affirmative, the controller 82 proceeds to step S41. In step S41, the controller 82 calculates the required braking force R of the electric brake device 38. In step S42, the controller 82 determines whether the required braking force R is greater than the first braking force R1. In a case where the determination result of step S42 is affirmative, the controller 82 proceeds to step S13.

In a case where the determination result of step S42 is negative, the controller 82 proceeds to step S43. In step S43, the controller 82 determines whether the required braking force R is less than or equal to the second braking force R2. In a case where the determination result of step S43 is negative, the controller 82 proceeds to step S24. In a case where the determination result of step S43 is affirmative, the controller 82 proceeds to step S15.

In the fourth example, the third condition includes a case where the battery level B is less than or equal to a first level B1. The fourth condition includes a case where the battery level B is greater than a second level B2. The first level B1 can be different from or the same as the second level B2.

The fourth example of the process executed by the controller 82 will now be described with reference to FIGS. 4 and 7. In a case where electric power is supplied to the controller 82, the controller 82 starts the process and proceeds to step S11 of the flowchart illustrated in FIG. 7. Upon completion of the flowcharts illustrated in FIGS. 4 and 7, the controller 82 repeats the process from step S11 in predetermined cycles until the supply of electric power is stopped. The controller 82 executes steps S11, S12, S13 to S16, S24, and S25 shown in FIG. 7 in the same manner as steps S11, S12, S13 to S16, S24, and S25 shown in FIG. 3.

Figure 7:
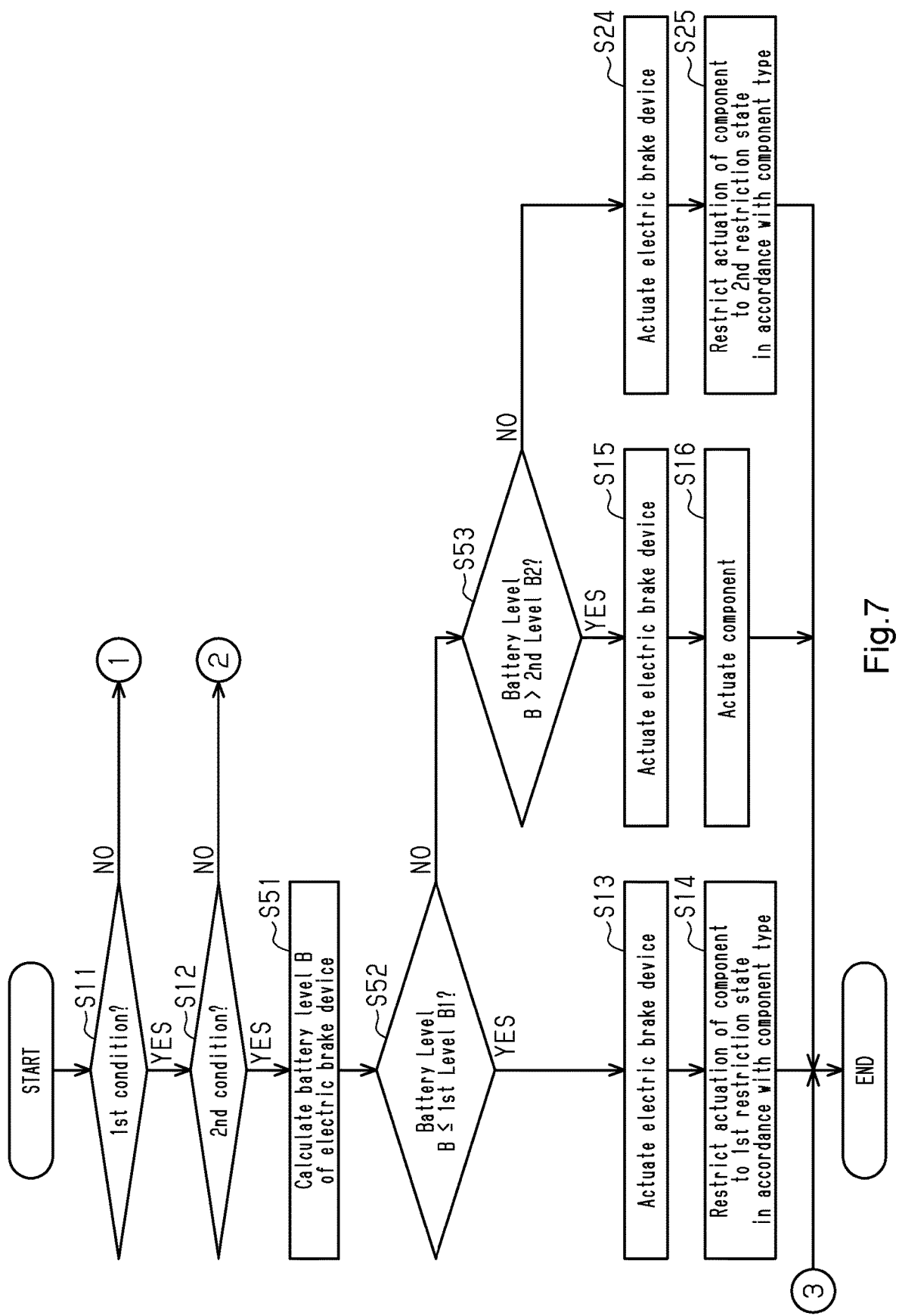
FIG. 7 is a flowchart showing a part of a fourth example of a process of the electronic controller shown in FIG. 2 for controlling the electric brake device and the component of the human-powered vehicle.

In FIG. 7, in a case where the determination result of step S12 is affirmative, the controller 82 proceeds to step S51. In step S51, the controller 82 calculates the battery level B. In step S52, the controller 82 determines whether the battery level B is less than or equal to the first level B1. In a case where the determination result of step S52 is affirmative, the controller 82 proceeds to step S13.

In a case where the determination result of step S52 is negative, the controller 82 proceeds to step S53. In step S53, the controller 82 determines whether the battery level B is greater than the second level B2. In a case where the determination result of step S53 is negative, the controller 82 proceeds to step S24. In a case where the determination result of step S53 is affirmative, the controller 82 proceeds to step S15.

In the fifth example, the third condition includes a case where the parameter P related to the vehicle kinetic state is less than or equal to a first value P1. The fourth condition includes a case where the parameter P related to the vehicle kinetic state is greater than a second value P2. The first value P1 can be different from or the same as the second value P2. Preferably, the parameter P related to the vehicle kinetic state has a value that increases as the required braking force R increases. The parameter P related to the vehicle kinetic state is, for example, the rotational speed N of the crank 12, which can be detected using the crank rotation sensor 94. The parameter P related to the vehicle kinetic state can be the vehicle speed of the human-powered vehicle 10 and the gradient of the road on which the human-powered vehicle 10 travels.

The fifth example of the process executed by the controller 82 will now be described with reference to FIGS. 4 and 8. In a case where electric power is supplied to the controller 82, the controller 82 starts the process and proceeds to step S11 of the flowchart illustrated in FIG. 8. Upon completion of the flowcharts illustrated in FIGS. 4 and 8, the controller 82 repeats the process from step S11 in predetermined cycles until the supply of electric power is stopped. The controller 82 executes steps S11, S12, S13 to S16, S24, and S25 shown in FIG. 8 in the same manner as steps S11, S12, S13 to S16, S24, and S25 shown in FIG. 3.

Figure 8:
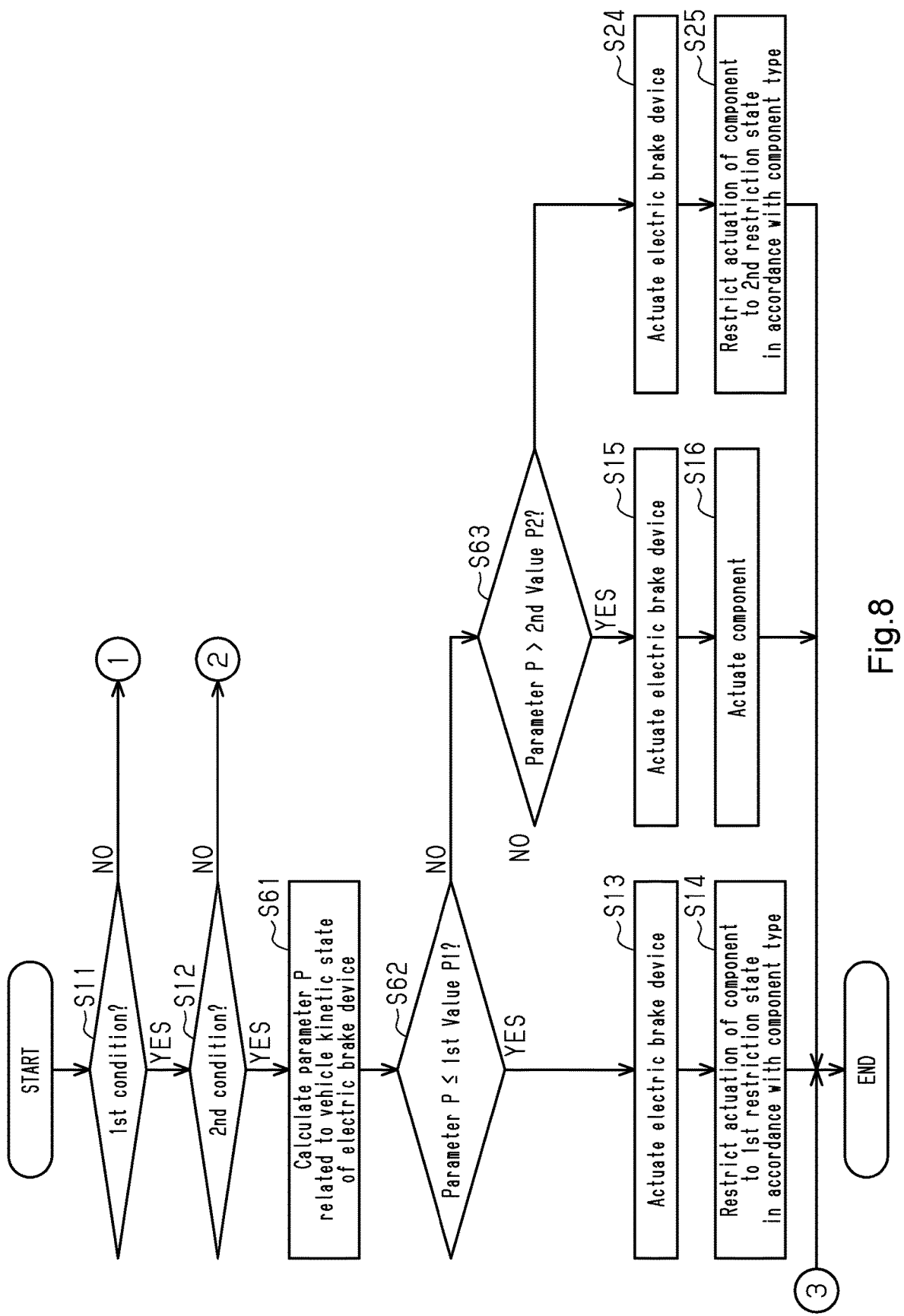
FIG. 8 is a flowchart showing a part of a fifth example of a process of the electronic controller shown in FIG. 2 for controlling the electric brake device and the component of the human-powered vehicle.

In FIG. 8, in a case where the determination result of step S12 is affirmative, the controller 82 proceeds to step S61. In step S61, the controller 82 calculates the parameter P related to the vehicle kinetic state of the electric brake device 38. In step S62, the controller 82 determines whether the parameter P related to the vehicle kinetic state of the electric brake device 38 is less than or equal to the first value P1. In a case where the determination result of step S62 is affirmative, the controller 82 proceeds to step S13.

In a case where the determination result of step S62 is negative, the controller 82 proceeds to step S63. In step S63, the controller 82 determines whether the parameter P related to the vehicle kinetic state of the electric brake device 38 is greater than the second value P2. In a case where the determination result of step S63 is negative, the controller 82 proceeds to step S24. In a case where the determination result of step S63 is affirmative, the controller 82 proceeds to step S15.

Preferably, in a case of restricting at least one of actuation of the electric brake device 38 and actuation of a further component 42, the controller 82 issues a notification of information related to the actuation restriction with the notification unit 72. For example, in a case of restricting actuation of the electric brake device 38, the notification unit 72 buzzes or shows an indication of restricting actuation of the electric brake device 38 on the display. For example, in a case of restricting actuation of the component 42, the notification unit 72 buzzes or shows an indication of restricting actuation of the component 42 on the display.

Preferably, the controller 82 restricts actuation of the electric brake device 38 in accordance with the battery level B of the battery 36. In a case of restricting actuation of the electric brake device 38 in accordance with the battery level B of the battery 36, the notification unit 72 issues a notification of information related to a decrease in the battery level B with the notification unit 72. The notification unit 72, for example, buzzes to notify that the battery level B of the battery 36 is decreased or shows information related to a decrease in the battery level B on the display.

A process for restricting actuations of the electric brake device 38 and the human-powered vehicle component 42 executed by the controller 82 will now be described with reference to FIG. 9. In a case where the controller 82 is supplied with electric power, the controller 82 starts the process and proceeds to step S71 of the flowchart illustrated in FIG. 9. Upon completion of the flowchart illustrated in FIG. 9, the controller 82 repeats the process from step S71 in predetermined cycles until the supply of electric power is stopped.

In step S71, the controller 82 calculates the battery level B and proceeds to step S72. In step S72, the controller 82 calculates necessary electric power BE of the electric brake device 38 and proceeds to step S73. In step S73, the controller 82 determines whether to restrict actuation of the electric brake device 38. The necessary electric power BE of the electric brake device 38 is determined based on, for example, the required braking force R.

In a case where the determination result of step S73 is affirmative, the controller 82 proceeds to step S74. In step S74, the controller 82 restricts actuation of the electric brake device 38 and proceeds to step S75. For example, in a case where the necessary electric power BE of the electric brake device 38 is less than or equal to the battery level B, the controller 82 restricts actuation of the electric brake device 38 so that the electric power usage amount E of the electric brake device 38 becomes less than or equal to the battery level B. In a case where the electric power usage amount E of the electric brake device 38 is decreased, steps S13 and S15 shown in FIGS. 3 to 8 are executed in accordance with the decreased electric power usage amount.

In step S75, the controller 82 controls the notification unit 72 to notify that actuation of the electric brake device 38 is restricted and then proceeds to step S76. In step S76, the controller 82 controls the notification unit 72 to notify that the battery level B is decreased and then proceeds to step S77. In step S77, the controller 82 determines whether to restrict actuation of the component 42 of the human-powered vehicle 10. For example, in a case where necessary electric power BF of the component 42 is less than or equal to the battery level B, the controller 82 restricts actuation of the component 42 so that the electric power usage amount of the component 42 becomes less than or equal to the battery level B. In a case where the electric power usage amount of the component 42 is decreased, steps S14, S16, and S19 shown in FIGS. 3 to 8 are executed in accordance with the decreased electric power usage amount. In a case where the component 42 is configured to perform a switching action, the controller 82 can be configured not to actuate the component 42 in a case where the necessary electric power BF of the component 42 is less than or equal to the battery level B.

In a case where the determination result of step S73 is negative, the controller 82 proceeds to step S77. In step S77, the controller 82 determines whether to restrict actuation of the component 42 of the human-powered vehicle 10.

In a case where the determination result of step S77 is negative, the controller 82 ends the process. In a case where the determination result of step S77 is affirmative, the controller 82 proceeds to step S78. In step S78, the controller 82 controls the notification unit 72 to notify that actuation of the human-powered vehicle component 42 is restricted and then ends the control.

Modifications

The description related to the above embodiment exemplifies, without any intention to limit, applicable forms of the human-powered vehicle control device 80 according to the present disclosure. The human-powered vehicle control device 80 according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiments. Such elements will not be described in detail.

The controller 82 can be configured not to restrict actuation of the component(s) 42 in a case where the first condition and the second condition are satisfied. In this case, in a case where the first condition and the second condition are satisfied, for example, the controller 82 actuates the electric brake device 38 and then actuates the component(s) 42. In a first example, in FIGS. 3 to 8, after actuating the electric brake device 38 in step S13, the controller 82 suspends the process of step S14 until actuation of the electric brake device 38 is completed. After actuating the electric brake device 38 in step S13, upon completion of actuation of the electric brake device 38, the controller 82 proceeds to step S14. In a second example, in FIGS. 3 to 8, after actuating the electric brake device 38 in step S13, the controller 82 suspends the process of step S14 so that a peak of the electric power usage amount E of the electric brake device 38 does not overlap a peak of the electric power usage amount of the component(s) 42. More specifically, the controller 82 calculates a time at which the peak of the electric power usage amount E of the electric brake device 38 occurs after actuation of the electric brake device 38 and a time at which the peak of the electric power usage amount E of the component 42 occurs after actuation of the component(s) 42 in advance. The controller 82 suspends the process of step S14 based on the times. After actuating the electric brake device 38 in step S13, the controller 82 proceeds to step S14 after the time in which the peak of the electric power usage amount E of the electric brake device 38 overlaps the peak of the electric power usage amount E of the component(s) 42 elapses.

In a case where neither the third condition nor the fourth condition is satisfied, the controller 82 can execute the same process as a case where the third condition is satisfied. For example, in FIG. 3, in a case where a negative determination is made in step S23, the controller 82 proceeds to step S13. For example, in FIG. 5, in a case where a negative determination is made in step S33, the controller 82 proceeds to step S13. For example, in FIG. 6, in a case where a negative determination is made in step S43, the controller 82 proceeds to step S13. For example, in FIG. 7, in a case where a negative determination is made in step S53, the controller 82 proceeds to step S13. For example, in FIG. 8, in a case where a negative determination is made in step S63, the controller 82 proceeds to step S13.

In a case where neither the third condition nor the fourth condition is satisfied, the controller 82 can execute the same process as a case where the fourth condition is satisfied. For example, in FIG. 3, in a case where a negative determination is made in step S23, the controller 82 proceeds to step S15. For example, in FIG. 5, in a case where a negative determination is made in step S33, the controller 82 proceeds to step S15. For example, in FIG. 6, in a case where a negative determination is made in step S43, the controller 82 proceeds to step S15. For example, in FIG. 7, in a case where a negative determination is made in step S53, the controller 82 proceeds to step S15. For example, in FIG. 8, in a case where a negative determination is made in step S63, the controller 82 proceeds to step S15.

Each of the third condition and the fourth condition can include a condition related to a value corresponding to two or more of the electric power usage amount E of the electric brake device 38, the required braking force R of the electric brake device 38, the battery level B of the battery 36, and the parameter P related to the vehicle kinetic state of the human-powered vehicle 10. For example, the controller 82 executes a combination including two or more of the first to fifth examples of the embodiment. For example, in a case where all of the first to fifth examples are combined, the processes shown in FIGS. 3 to 8 can proceed to step S13 at least one of a case where the electric power usage amount E of the electric brake device 38 is greater than the first electric power usage amount E1, a case where the sum EA of the electric power usage amounts of the electric brake device 38 and the component(s) 42 is greater than the second electric power usage amount EA2, a case where the required braking force R of the electric brake device 38 is greater than the first braking force R1, a case where the battery level B is less than or equal to the first level B1, and a case where the parameter P related to the vehicle kinetic state is less than or equal to the first value P1.

In a case where the third condition and the fourth condition are mutually exclusive, steps S23, S33, S43, S53, and S63 can be omitted from FIGS. 3, 5, 6, 7, and 8, respectively. For example, in FIG. 3, in a case where an affirmative determination is made in step S22, the controller 82 proceeds to step S13, and in a case where a negative determination is made in step S22, the controller 82 proceeds to step S15. For example, in FIG. 5, in a case where an affirmative determination is made in step S32, the controller 82 proceeds to step S13, and in a case where a negative determination is made in step S32, the controller 82 proceeds to step S15. For example, in FIG. 6, in a case where an affirmative determination is made in step S42, the controller 82 proceeds to step S13, and in a case where a negative determination is made in step S42, the controller 82 proceeds to step S15. For example, in FIG. 7, in a case where an affirmative determination is made in step S52, the controller 82 proceeds to step S13, and in a case where a negative determination is made in step S52, the controller 82 proceeds to step S15. For example, in FIG. 8, in a case where an affirmative determination is made in step S62, the controller 82 proceeds to step S13, and in a case where a negative determination is made in step S62, the controller 82 proceeds to step S15.

In a case where the first condition and the second condition are both satisfied, the controller 82 can give actuation priority to the electric brake device 38 without determining whether the third condition and the fourth condition are satisfied. For example, in a case where an affirmative determination is made in step S12 shown in FIGS. 3 to 8, the controller 82 proceeds to step S13.

Figure 9:
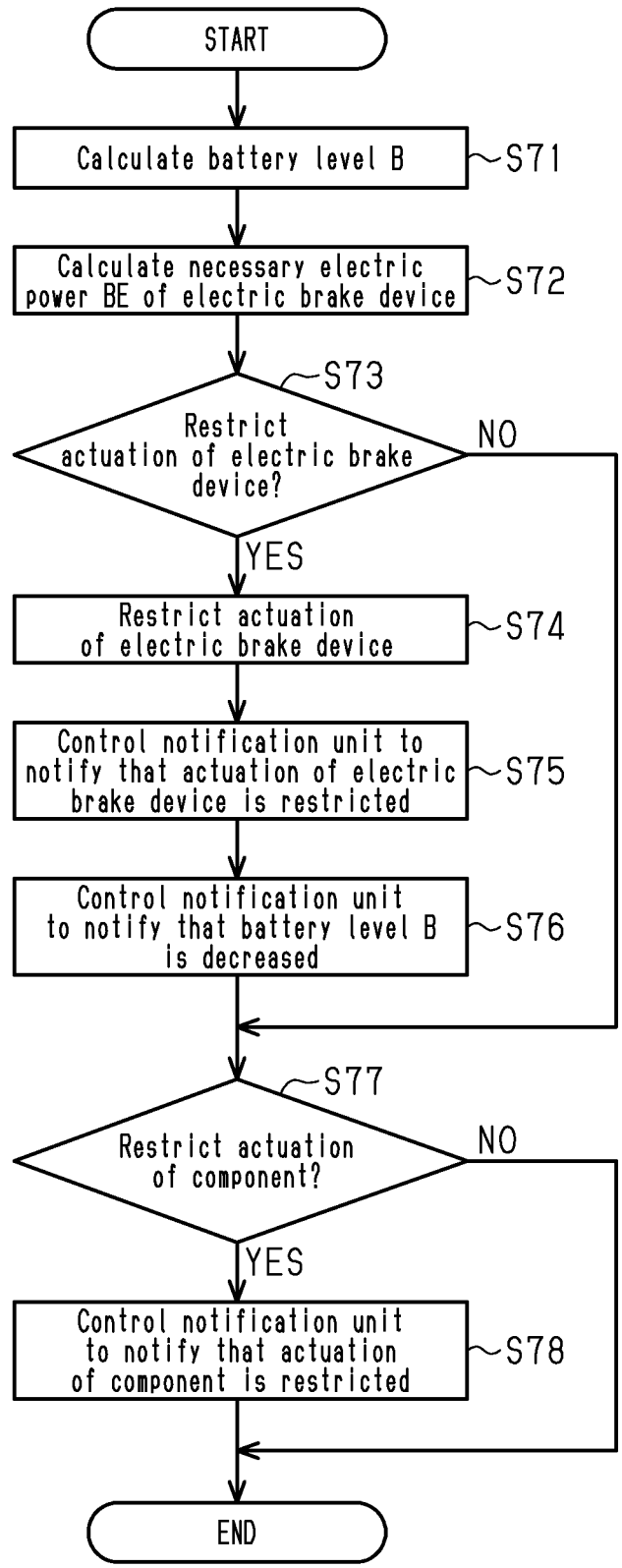
FIG. 9 is a flowchart showing a process of the electronic controller shown in FIG. 2 for restricting actuation of the electric brake device and the component of the human-powered vehicle.

Steps S77 and S78 can be omitted from FIG. 9. In this case, the controller 82 executes step S76 and then ends the process. Steps S72, S73, S74, S75, and S76 can be omitted from FIG. 9. In this case, the controller 82 executes step S71 then proceeds to step S77.

In a case where the human-powered vehicle component 42 includes two or more components 42, predetermined priority ranks can be stored in the storage 84. In a case where the second conditions corresponding to the components 42 are substantially simultaneously satisfied, the controller 82 actuates a component 42 having a high priority rank and restricts actuation of a component 42 having a low priority rank or actuates the component 42 having a high priority rank and then actuates the component 42 having a low priority rank. In this modification, in a case where the first condition and the second condition are both satisfied and the second conditions corresponding to the components 42 are substantially simultaneously satisfied, the controller 82, for example, gives actuation priority to the electric brake device 38 then determines whether to restrict the components 42 from one having a higher priority rank or sequentially actuates the components 42 from one having a higher priority rank.

In a case where the second conditions corresponding to the components 42 are substantially simultaneously satisfied, the controller 82 can be configured to restrict some of the components 42 and not to restrict the other components 42. In this modification, in a case where the controller 82 includes the first restriction state and the second restriction state, the controller 82 can restrict more components 42 in the first restriction state than in the second restriction state. In this case, the controller 82 restricts actuation of a component 42 having a low priority rank in both the first restriction state and the second restriction state, whereas the controller 82 restricts actuation of a component 42 having a high priority rank in the first restriction state but does not restrict actuation of the component 42 having a high priority rank in the second restriction state.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle, the human-powered vehicle control device comprising:
    an electronic controller configured to control an electric brake device and a component of the human-powered vehicle that differs from the electric brake device,
    the electric brake device and the component being supplied with electric power from a common battery, and
    the electronic controller being configured to give actuation priority to the electric brake device over the component by actuating the electric brake device and restricting actuation of the component, the electronic controller being further configured to give actuation priority to the electric brake device over the component by actuating the electric brake device and then actuating the component.

2. The human-powered vehicle control device according to claim 1, wherein
    the electronic controller is configured to actuate the electric brake device upon determining at least one of a traveling environment of the human-powered vehicle, a traveling state of the human-powered vehicle, and an operation state of the electric brake device is in a first condition;
    the electronic controller is configured to actuate the component upon determining at least one of the traveling environment of the human-powered vehicle and the traveling state of the human-powered vehicle is in a second condition; and
    upon determining the first condition and the second condition are both satisfied, the electronic controller is configured to actuate the electric brake device and restrict actuation of the component, or actuate the electric brake device and then actuate the component.

3. The human-powered vehicle control device according to claim 2, wherein
    upon determining the first condition and the second condition are both satisfied and at least one of the traveling environment of the human-powered vehicle and the traveling state of the human-powered vehicle is in a third condition, the electronic controller is configured to actuate the electric brake device and restrict actuation of the component, or actuate the electric brake device and then actuate the component;
    upon determining the first condition and the second condition are both satisfied and at least one of the traveling environment of the human-powered vehicle and the traveling state of the human-powered vehicle is in a fourth condition, the electronic controller is configured to not to restrict actuation of the component, or simultaneously actuate the electric brake device and the component; and
    each of the third condition and the fourth condition is related to at least one of an electric power usage amount of the electric brake device, a required braking force of the electric brake device, a battery level of the battery, and a parameter related to a vehicle kinetic state of the human-powered vehicle.

4. The human-powered vehicle control device according to claim 3, wherein
    the third condition includes a case where the electric power usage amount of the electric brake device is greater than a first electric power usage amount.

5. The human-powered vehicle control device according to claim 3, wherein
    the third condition includes a case where a sum of the electric power usage amount of the electric brake device and an electric power usage amount of the component is greater than a second electric power usage amount.

6. The human-powered vehicle control device according to claim 3, wherein
    the third condition includes a case where the required braking force of the electric brake device is greater than a first braking force.

7. The human-powered vehicle control device according to claim 3, wherein
    the third condition includes a case where the battery level is less than or equal to a first level.

8. The human-powered vehicle control device according to claim 3, wherein
    the third condition includes a case where the parameter related to the vehicle kinetic state is less than or equal to a first value.

9. The human-powered vehicle control device according to claim 3, wherein
    the fourth condition includes a case where the electric power usage amount of the electric brake device is less than or equal to a third electric power usage amount.

10. The human-powered vehicle control device according to claim 3, wherein
    the fourth condition includes a case where a sum of the electric power usage amount of the electric brake device and an electric power usage amount of the component is less than or equal to a fourth electric power usage amount.

11. The human-powered vehicle control device according to claim 3, wherein the fourth condition includes a case where the required braking force is less than or equal to a second braking force.

12. The human-powered vehicle control device according to claim 3, wherein
the fourth condition includes a case where the battery level is greater than a second level.

13. The human-powered vehicle control device according to claim 3, wherein
the fourth condition includes a case where the parameter related to the vehicle kinetic state is greater than a second value.

14. The human-powered vehicle control device according to claim 2, wherein
the component includes a plurality of components, and
upon determining the first condition and the second condition are both satisfied, the electronic controller is configured to control the components in accordance with a component type.

15. The human-powered vehicle control device according to claim 1, wherein
the electric brake device includes at least one of a front electric brake device and a rear electric brake device.

16. The human-powered vehicle control device according to claim 1, wherein
the component includes at least one of a motor of a transmission, a drive unit, a front lamp, a rear lamp, an adjustable seatpost device, a suspension device, a display device, an audio device, a grip heater, a seat heater, a wireless communication device, a front image capturing device, and a rear image capturing device.

17. A human-powered vehicle control device for a human-powered vehicle, the control device comprising:
an electronic controller configured to control an electric brake device and a component of the human-powered vehicle that differs from the electric brake device,
the electric brake device and the component being supplied with electric power from a common battery, and
the electronic controller being configured to actuate the electric brake device upon determining at least one of a traveling environment of the human-powered vehicle, a traveling state of the human-powered vehicle, and an operation state of the electric brake device is in a first condition,
the electronic controller being configured to actuate the component upon determining at least one of the traveling environment of the human-powered vehicle and the traveling state of the human-powered vehicle is in a second state, and
upon determining the first condition and the second condition are both satisfied, the electronic controller being configured to actuate the electric brake device and restrict actuation of the component, or actuate the electric brake device and then actuate the component.

18. A human-powered vehicle control device for a human-powered vehicle, the human-powered vehicle control device comprising:
an electronic controller configured to control an electric brake device and a component of the human-powered vehicle that differs from the electric brake device,
the electric brake device and the component being supplied with electric power from a common battery, and
the electronic controller being configured to give actuation priority to the electric brake device over the component, in at least one of a case where the electronic controller restricts actuation of the electric brake device and a case where the electronic controller restricts actuation of a further component, the electronic controller is configured to issue a notification of information related to actuation restriction with a notification unit.

19. The human-powered vehicle control device according to claim 18, wherein
the electronic controller is configured to restrict actuation of the electric brake device in accordance with a battery level of the battery, and
in a case where the electronic controller restricts actuation of the electric brake device in accordance with the battery level of the battery, the electronic controller is configured to issue a notification indicative of a decrease in the battery level with the notification unit.

* * * * *